(12) United States Patent
Bruno et al.

(10) Patent No.: US 8,915,095 B2
(45) Date of Patent: Dec. 23, 2014

(54) HYBRID ENVIRONMENTAL CONDITIONING SYSTEM

(75) Inventors: Louis J. Bruno, Ellington, CT (US); Douglas L. Christians, Vernon, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 1575 days.

(21) Appl. No.: 12/209,389

(22) Filed: Sep. 12, 2008

(65) Prior Publication Data

US 2010/0064701 A1 Mar. 18, 2010

(51) Int. Cl.
*F25D 9/00* (2006.01)
*B64D 13/06* (2006.01)

(52) U.S. Cl.
CPC ........ *B64D 13/06* (2013.01); *B64D 2013/0618* (2013.01); *Y02T 50/56* (2013.01); *B64D 2013/0644* (2013.01); *B64D 2013/0674* (2013.01)
USPC .......................................................... 62/333

(58) Field of Classification Search
CPC ........... F25D 9/00; F25D 15/00; F25D 17/00; F02C 7/12; B64D 13/06; B64D 2013/0644; B64D 2013/0674; B64D 2013/0618; Y02T 50/56; B25B 9/00
USPC .............. 62/87, 93, 172, 333, 402, 401, 115, 62/500, 515; 60/39.07, 366; 244/118.5
See application file for complete search history.

(56) References Cited

U.S. PATENT DOCUMENTS

| | | | | |
|---|---|---|---|---|
| 4,021,215 A | * | 5/1977 | Rosenbush et al. | 62/402 |
| 4,055,946 A | | 11/1977 | Sens | |
| 4,236,869 A | | 12/1980 | Laurello | |
| 4,283,924 A | * | 8/1981 | Schutze | 62/402 |
| 4,295,518 A | * | 10/1981 | Rannenberg | 165/62 |
| 4,347,714 A | | 9/1982 | Kinsell et al. | |
| 4,434,624 A | * | 3/1984 | Cronin et al. | 62/172 |
| 4,444,018 A | | 4/1984 | Kinsell et al. | |
| 4,444,021 A | | 4/1984 | Kinsell et al. | |
| 4,445,639 A | | 5/1984 | Kinsell et al. | |
| 4,829,775 A | * | 5/1989 | Defrancesco | 62/90 |
| 5,151,022 A | * | 9/1992 | Emerson et al. | 423/245.3 |
| 5,313,778 A | | 5/1994 | Sweet et al. | |
| 5,555,745 A | * | 9/1996 | Agahi et al. | 62/401 |
| 5,704,218 A | | 1/1998 | Christians et al. | |
| 5,860,283 A | | 1/1999 | Coleman et al. | |

(Continued)

FOREIGN PATENT DOCUMENTS

| | | |
|---|---|---|
| EP | 1327582 A1 | 7/2003 |
| JP | 2000-344198 | 12/2000 |

(Continued)

OTHER PUBLICATIONS

Extended European Search Report dated May 3, 2012 for EP Application No. 09251230.0.

*Primary Examiner* — Frantz F Jules
*Assistant Examiner* — Emmanuel Duke
(74) *Attorney, Agent, or Firm* — Carlson, Gaskey & Olds, P.C.

(57) ABSTRACT

An environmental conditioning system has a compressor for compressor air in an air flow path. A turbine drives the compressor and is coupled to the compressor. An evaporator is in communication with the compressor. The evaporator is configured to cool air from the compressor.

18 Claims, 2 Drawing Sheets

(56) References Cited

U.S. PATENT DOCUMENTS

| | | | |
|---|---|---|---|
| 5,899,085 A * | 5/1999 | Williams | 62/236 |
| 5,918,472 A * | 7/1999 | Jonqueres | 62/87 |
| 5,921,093 A * | 7/1999 | Jonqueres | 62/86 |
| 5,956,960 A * | 9/1999 | Niggeman | 62/172 |
| 6,000,210 A | 12/1999 | Negulescu | |
| 6,099,617 A | 8/2000 | Bennett | |
| 6,199,387 B1 * | 3/2001 | Sauterleute | 62/87 |
| 6,427,471 B1 * | 8/2002 | Ando et al. | 62/402 |
| 6,457,318 B1 * | 10/2002 | Lui et al. | 62/87 |
| 6,948,331 B1 * | 9/2005 | Ho | 62/401 |
| 2004/0014419 A1 | 1/2004 | Lents et al. | |
| 2005/0076661 A1 * | 4/2005 | Zywiak et al. | 62/244 |
| 2005/0268644 A1 * | 12/2005 | Oshitani et al. | 62/500 |
| 2008/0110193 A1 * | 5/2008 | Jonqueres | 62/331 |

FOREIGN PATENT DOCUMENTS

| | | | | |
|---|---|---|---|---|
| JP | 2002-115926 | * | 4/2002 | F25B 9/00 |
| JP | 2002115926 A | | 4/2002 | |
| JP | 2005-67356 | | 3/2005 | |
| JP | 2007-521183 | | 8/2007 | |
| WO | 2005/030579 | | 4/2005 | |

* cited by examiner

HYBRID ENVIRONMENTAL CONDITIONING SYSTEM

BACKGROUND OF THE INVENTION

This invention relates to an environmental conditioning system for a vehicle, such as an aircraft.

In flight, an aircraft may obtain conditioned air from a compressor of a turbine engine. Bleed air is output at a high temperature from the compressor and is passed through a heat exchanger to lower the air's temperature. The air eventually passes to the passenger compartment. This process of conditioning air from the compressor is known as an air cycle.

This method of conditioning air is inefficient. More energy than is necessary is used to condition the air because the pressure delivered by the engine compressor exceeds the pressure required for adequate conditioning at most operating points and is throttled away. Generating the unnecessary pressure is inefficient use of power. As a consequence of the inefficiency of the environmental conditioning system, the aircraft consumes more fuel than necessary.

A need therefore exists for more efficient environmental conditioning system for use on an aircraft.

SUMMARY OF THE INVENTION

An environmental conditioning system has a compressor for compressing air in an air flow path. A turbine drives the compressor. The turbine is coupled to the compressor. An evaporator is in communication with the compressor in the air flow path. The evaporator is configured to cool air from the compressor.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
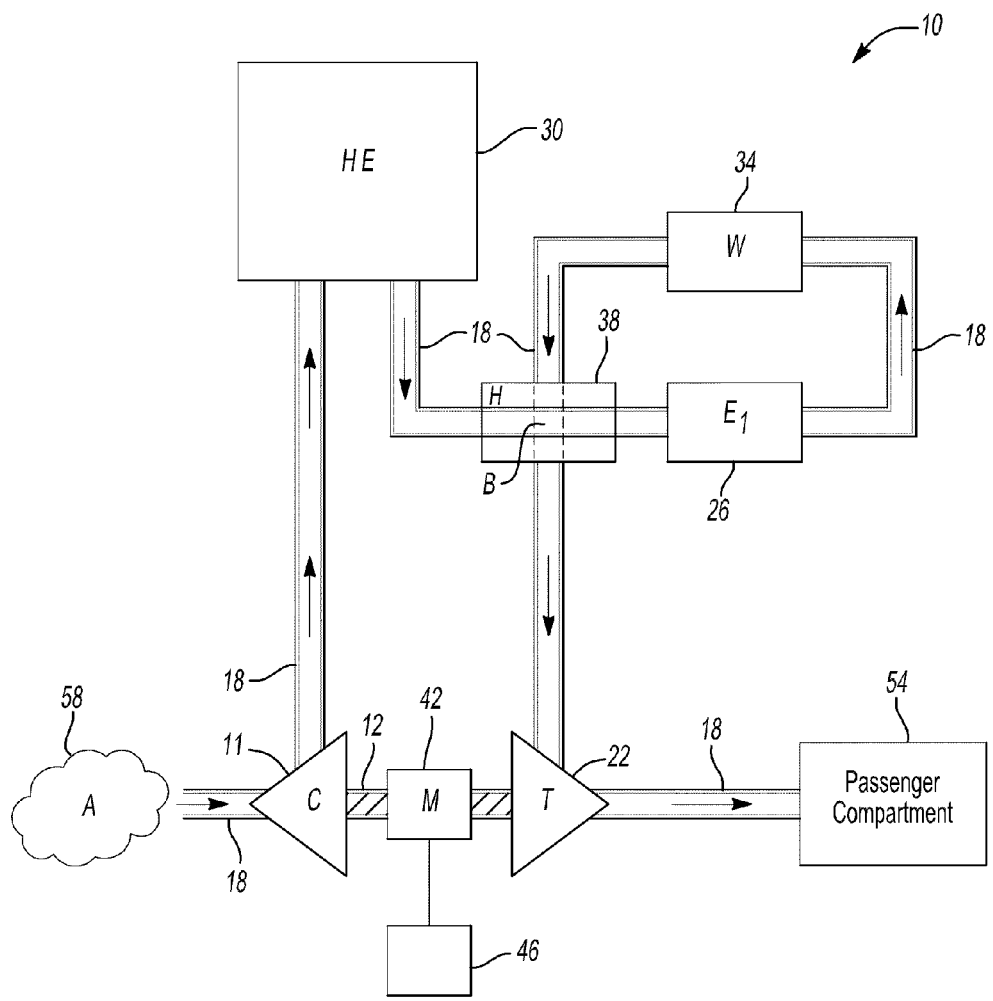
FIG. 1 illustrates a schematic view of the inventive environmental conditioning system, including compressor, turbine and evaporator.

With reference to FIG. 1, there is shown a schematic view of an inventive environmental conditioning system 10 for a vehicle, such as an aircraft. As shown, there is air flow path 18, through which air is obtained from air source 58 and conditioned for use in passenger compartment 54. In air flow path 18 are compressor 11, heat exchanger 30, reheater 38, evaporator 26, water removal device 34 and turbine 22. Compressor 11 is coupled to turbine 22 by shaft 12. Compressor 11 is driven by turbine 22 and may also receive power from motor 42.

Air from air source 58, such as an outside air source or bleed air from another compressor (not shown), is communicated to compressor 11. Compressor 11 pressurizes and thereby heats air in air flow path 18 and directs air to heat exchanger 30. Heat exchanger 30, which may be one heat exchanger or a series of heat exchangers, rejects heat to a heat sink and thereby reduces the temperature of air from compressor 11. The heat sink may be cooled by ambient air. Air flow then moves from heat exchanger 30 to reheater 38 and then to first evaporator 26. Air from the first evaporator 26 serves as the heat sink for the reheater 38 which reduces the heat transfer required by the evaporator 26.

At first evaporator 24, air in air flow path 18 can be significantly and efficiently reduced in temperature. First evaporator 24 is a vapor cycle evaporator with refrigerant. Refrigerant compressor and condenser are not shown but supply first evaporator 26 with refrigerant gas as known to cool first evaporator 26. First evaporator 26 cools air in air flow path 18 causing moisture in air to condense. This moisture is then removed by water removal device 34. Air is then passed through reheater 38 to be reheated. Turbine 22 then directs air along air flow path 18 to passenger compartment 54 and expands the air reducing the temperature and pressure of the air further.

Turbine 22 may receive power from the bleed air of a compressor (not shown) from a turbine engine. Motor 42 is attached to shaft 12 and can provide additional power to compressor 11 and turbine 22 when bleed air pressure from the turbine engine is inadequate. Motor 42 is controlled by control unit 46, which operates to control the speed of rotation of shaft 12 thereby controlling the speed of rotation of compressor 11 and turbine 22. In this way, the amount of air supplied to compartment 54 can be controlled.

Raising the speed of motor 42 and therefore compressor 11 and turbine 22 results in increasing air flow to passenger compartment 54 while decreasing motor speed decreases air flow to passenger compartment 54. If there is excess power available to turbine 22 and compressor 11, this additional power may be used to drive a ram air heat sink for heat exchanger 30.

As a consequence of this design, the power required to condition air for passenger compartment 54 is optimized because the amount of heat removed by first evaporator 26 can be great without a substantial consumption of energy. By using an evaporator in conjunction with the heat exchanger, an efficient balance can be reached between conditioning by an air cycle and a vapor cycle. Furthermore, reheater 38 and first evaporator 26 can be designed so as to provide conditioned air at a desired supply temperature and relative humidity.

Also, with motor 42, air source pressure can be used when it is most effective for cooling or can be augmented through power from motor 42 if it is not. In this way, air from compressor 11 need not be over-pressurized at off design conditions to meet the highest cooling requirements. The amount of air flow through environmental conditioning system 10 can be controlled by the power input from motor 42 to shaft 12.

Figure 2:
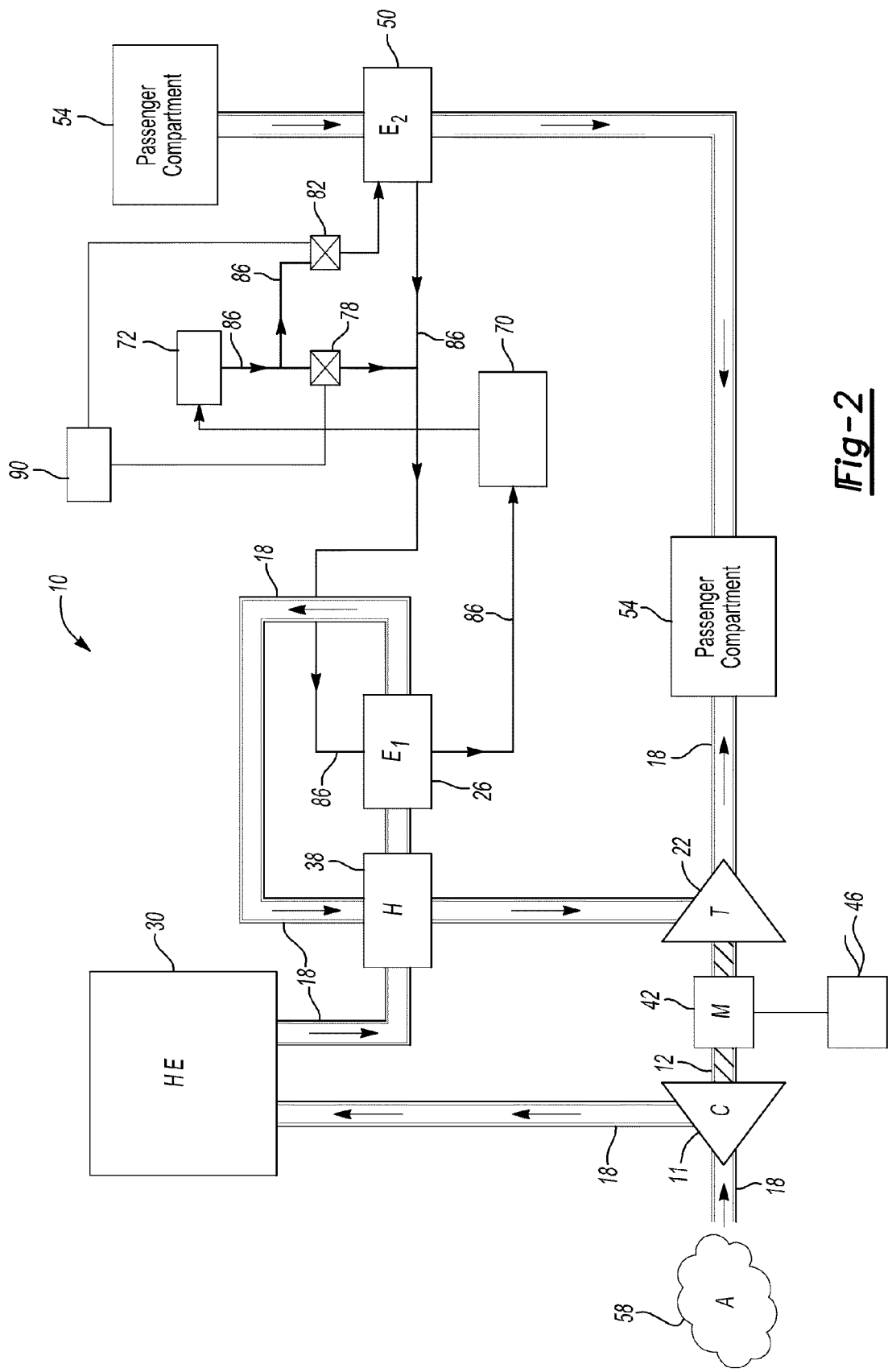
FIG. 2 illustrates the environmental conditioning system of FIG. 1 with the addition of another evaporator.

With reference to FIG. 2 there is shown an additional evaporator, second evaporator 50, which is added to the environmental conditioning system 10 of FIG. 2. Second evaporator 50 is also vapor cycle evaporator with refrigerant. As shown, second evaporator 50 obtains air from passenger compartment 54. Excess heat in air from passenger compartment 54 is removed by second evaporator 50 through another vapor cycle evaporation process. In this way, recirculated air from passenger compartment 54 may be conditioned and mixed with fresh air from air source 58 into passenger compartment 54 providing an efficient combination of both fresh and recirculated air. A proportion of fresh air can be provided with recirculated air so that a high quality of air may be maintained in passenger compartment 54 without large energy consumption by environmental conditioning system 10.

Refrigerant that exits second evaporator 50 is controlled to desired levels of superheat. Refrigerant is then communicated to first evaporator 26 through refrigerant flow path 86, which is then passed to refrigerant compressor 70, which is part of the vapor cycle of environmental conditioning system 10. Refrigerant compressor 70 compresses refrigerant for first evaporator 26 and second evaporator 50. Compressed refrigerant is then passed to refrigerant condenser 72, or a subcooler, which then returns refrigerant either to second evaporator 50 or to first evaporator 26. First valve 78 and second valve 82 are provided and controlled by valve control unit 90, which determines what proportion of refrigerant from refrigerant condenser 72 to return to first evaporator 26 and to return to second evaporator 50. In this way, the cooling demands between the two evaporators, first evaporator 26 and second evaporator 50, can be balanced. Because first evaporator 26 and second evaporator 50 are in series along refrigerant flow path 86, the total required refrigerant flow is minimized. Also, first evaporator 26 is typically exposed to higher temperature air and therefore can be used to impose substantial superheat into the system if desired. The superheat can be used to drive up the discharge temperature of vapor cycle compressor 70 and enable more efficient operation.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An environmental conditioning system, comprising:
   a compressor for compressing air in an air flow path;
   a turbine for driving said compressor and providing air flow to a passenger compartment, said turbine coupled to said compressor;
   a first evaporator in communication with air from said compressor, said first evaporator configured to cool air from said compressor;
   a heat exchanger disposed in said air flow path between said compressor and said first evaporator, said heat exchanger configured to cool air from said compressor;
   a second evaporator downstream of said first evaporator, wherein said second evaporator is configured to cool air from the passenger compartment, wherein said first and second evaporators are in fluid communication and in series within a refrigerant flow path of a refrigerant system;
   a first control valve controlling refrigerant flow to the first evaporator;
   a second control valve controlling refrigerant flow to the second evaporator; and
   a controller controlling the first control valve and the second control valve for balancing the refrigerant flow to each of the first evaporator and the second evaporator for controlling a combination of air flow from the turbine and recirculated air flow from the passenger compartment.

2. The environmental conditioning system of claim 1 including a water removal device for removing water from said air flow path.

3. The environmental conditioning system of claim 2 wherein said water removal device is disposed downstream of said first evaporator.

4. The environmental conditioning system of claim 1 including a reheater for moving heat from upstream to downstream of said first evaporator.

5. The environmental conditioning system of claim 4 wherein said first evaporator is a heat sink for said reheater.

6. The environmental conditioning system of claim 1 wherein said turbine is in said air flow path downstream of said first evaporator.

7. The environmental conditioning system of claim 1 including a motor coupled to said turbine and said compressor.

8. The environmental conditioning system of claim 7 including a control unit for controlling said motor, said control unit configured to control a speed of said motor.

9. The environmental conditioning system of claim 1, wherein said second evaporator is configured to receive air from said passenger compartment.

10. The environmental conditioning system of claim 9 wherein said compressor is configured to receive air from an air source outside of the passenger compartment.

11. An environmental conditioning system, comprising:
    a compressor for compressing air in an air flow path;
    a turbine for driving said compressor, said turbine coupled to said compressor;
    a first evaporator in communication with said compressor, said first evaporator configured to cool air from said compressor, wherein said turbine is in said air flow path downstream of said first evaporator;
    a reheater for warming air downstream of said first evaporator, said reheater configured to obtain heat from said compressor to warm air downstream of said first compressor;
    a heat exchanger disposed in said air flow path between said compressor and said first evaporator, said heat exchanger configured to cool air from said compressor;
    a second evaporator downstream of said first evaporator, wherein said second evaporator is configured to cool air from the passenger compartment, wherein each of the first and second evaporators are in fluid communication and in series within a refrigerant flow path of a refrigerant system;
    a first control valve controlling refrigerant flow to the first evaporator;
    a second control valve controlling refrigerant flow to the second evaporator; and
    a controller governing operation of the first control valve and the second control valve for balancing the refrigerant flow to each of the first evaporator and the second evaporator for controlling a combination of air flow from the turbine and recirculated air flow from the passenger compartment.

12. The environmental conditioning system of claim 11 including a water removal device for removing water from said air flow path.

13. The environmental conditioning system of claim 12 wherein said water removal device is disposed between said first evaporator and said turbine in said air flow path.

14. The environmental conditioning system of claim 11 including a motor coupled to said turbine and said compressor.

15. The environmental conditioning system of claim 14 including a control unit for controlling said motor, said control unit configured to control a speed of said motor.

16. The environmental conditioning system of claim 11, wherein said second evaporator is configured to receive air from the passenger compartment of a vehicle.

17. The environmental conditioning system of claim 16 wherein said compressor is configured to receive air from an air source outside of the passenger compartment.

18. A method of environment conditioning, comprising the steps of:
    compressing air through a compressor driven by a turbine;

evaporating the air to remove heat;
reheating the air;
expelling the reheated air through the turbine into a passenger compartment of a vehicle;
recirculating a portion of air from the passenger compartment; and
controlling a temperature of air provided to the passenger compartment by controlling operation of a first control valve governing refrigerant flow to a first evaporator and a second control valve governing operation of refrigerant flow to a second evaporator in series with the first evaporator for balancing refrigerant flow to each of the first evaporator configured to cool air from the compressor and the second evaporator configured to cool air from the passenger compartment for governing a temperature of air from the turbine and air recirculated from the passenger compartment.

* * * * *